(12) United States Patent
Witcraft et al.

(10) Patent No.: US 7,277,793 B2
(45) Date of Patent: Oct. 2, 2007

(54) METHOD AND APPARATUS FOR AN INTEGRATED GPS RECEIVER AND ELECTRONIC COMPASSING SENSOR DEVICE

(75) Inventors: William F. Witcraft, Minneapolis, MN (US); Hong Wan, Plymouth, MN (US); Chesian J. Yue, Roseville, MN (US); Tamara K. Bratland, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/685,277

(22) Filed: Mar. 13, 2007

(65) Prior Publication Data

US 2007/0162221 A1     Jul. 12, 2007

Related U.S. Application Data

(62) Division of application No. 10/754,947, filed on Jan. 8, 2004, now Pat. No. 7,206,693.

(60) Provisional application No. 60/475,191, filed on Jun. 2, 2003, provisional application No. 60/475,175, filed on Jun. 2, 2003, provisional application No. 60/462,872, filed on Apr. 15, 2003.

(51) Int. Cl.
*G01C 21/26* (2006.01)
(52) U.S. Cl. ....................... 701/207; 701/217
(58) Field of Classification Search ................ 701/200, 701/213, 217, 224; 702/92, 115–117; 342/357.06, 342/357.12
See application file for complete search history.

(56) References Cited

U.S. PATENT DOCUMENTS

| | | | |
|---|---|---|---|
| 4,847,584 A | 7/1989 | Pant |
| 5,117,232 A | 5/1992 | Cantwell |
| 5,247,278 A | 9/1993 | Pant et al. |
| 5,521,501 A | 5/1996 | Dettmann et al. |
| 5,790,477 A | 8/1998 | Hauke |
| 5,820,924 A | 10/1998 | Witcraft et al. |
| 5,940,319 A | 8/1999 | Durlam et al. |
| 5,995,023 A | 11/1999 | Kreft |
| 6,219,273 B1 | 4/2001 | Katti et al. |
| 6,331,924 B1 | 12/2001 | Takada |
| 6,461,914 B1 | 10/2002 | Roberts et al. |
| 6,462,983 B2 | 10/2002 | Katti et al. |

(Continued)

FOREIGN PATENT DOCUMENTS

EP        1 387 146 A2    2/2004

OTHER PUBLICATIONS

Google Search: Dielectric (searched Nov. 18, 2005).

(Continued)

*Primary Examiner*—Yonel Beaulieu

(57) ABSTRACT

At least one magnetic field sensing device and GPS receiver integrated in a discrete, single-chip package, and a method of manufacture for the same. Rather than requiring at least two separate chips to be used to realize GPS positioning and compassing capabilities in a single device, an integrated, single chip solution can be used. A single chip integration of a GPS receiver and at least one magnetic field sensing device can reduce the physical space required to provide positioning and electronic compassing capabilities in a single device, and therefore allow such devices to be smaller, lighter, and possibly more portable.

15 Claims, 8 Drawing Sheets

U.S. PATENT DOCUMENTS

| | | | |
|---|---|---|---|
| 7,069,145 B2 * | 6/2006 | Jendbro et al. | 701/207 |
| 7,199,800 B2 * | 4/2007 | Ogawa | 345/537 |
| 7,206,693 B2 * | 4/2007 | Witcraft et al. | 701/207 |
| 2002/0008661 A1 | 1/2002 | McCall et al. | |
| 2002/0021580 A1 | 2/2002 | Katti et al. | |
| 2002/0153551 A1 | 10/2002 | Wong et al. | |
| 2003/0016011 A1 | 1/2003 | Witcraft et al. | |
| 2003/0042900 A1 | 3/2003 | Witcraft et al. | |
| 2003/0042901 A1 | 3/2003 | Witcraft et al. | |

OTHER PUBLICATIONS

Google Search: Die (searched Nov. 18, 2005).

International Search Report mailed Dec. 12, 2004.

Geppert, Linda,. "The New Indelible Memories: It's A Three-Way Race In the Multibillion-Dollar Memory Sweepstakes," IEEE Spectrum, Mar. 2003.

"Magnetic Sensor Products HMC/HMR Series," Honeywell International Inc., no date.

"Honeywell Magnetic Sensors Product Catalog," Honeywell International Inc., no date.

"1-and 2-Axis Magnetic Sensors HMC1001/1002 : HMC1021/1022," Honeywell International Inc., no date.

"Magnetic Sensors, Frequently Asked Questions" printed from the World Wide Web at http://www.ssec.honeywell/magnetic/faq.htm on May 6, 2003.

* cited by examiner

METHOD AND APPARATUS FOR AN INTEGRATED GPS RECEIVER AND ELECTRONIC COMPASSING SENSOR DEVICE

RELATED APPLICATIONS

This Application is a divisional of U.S. application Ser. No. 10/754,947, now U.S. Pat. No. 7,206,693, filed Jan. 8, 2004, which claims the benefit of U.S. Provisional Application Nos. (1) 60/475,191, filed Jun. 2, 2003, entitled "Semiconductor Device Integration with a Magneto-Resistive Sensor," naming as inventors Lonny L. Berg and William F. Witcraft; (2) 60/475,175, filed Jun. 2, 2003, entitled "On-Die Set/Reset Driver for a Magneto-Resistive Sensor," naming as inventors Mark D. Amundson and William F. Witcraft; and (3) 60/462,872, filed Apr. 15, 2003, entitled "Integrated GPS Receiver and Magneto-Resistive Sensor Device," naming as inventors William F. Witcraft, Hong Wan, Cheisan J. Yue, and Tamara K. Bratland. The present application also incorporates each of these Provisional Applications in their entirety by reference herein.

This application is also related to and incorporates by reference U.S. Nonprovisional Application Ser. No. (1) 10/754,946, filed concurrently, entitled "Semiconductor Device and Magneto-Resistive Sensor Integration," naming as inventors Lonny L. Berg, William F. Witcraft, and Mark D. Amundson; and (2) Ser. No. 10/754,945, filed concurrently, entitled "Integrated Set/Reset Driver and Magneto-Resistive Sensor," naming as inventors Lonny L. Berg and William F. Witcraft.

BACKGROUND

1. Field of the Invention

The present invention relates in general to magnetic field and current sensing, and more particularly to integrating a GPS receiver with a compassing sensor.

2. Description of Related Art

Magnetic field sensors have applications in magnetic compassing, ferrous metal detection, and current sensing. They may be used to detect variations in the magnetic field of machine components and in the earth's magnetic field, as well as to detect underground minerals, electrical devices, and power lines. For such applications, an anisotropic magneto-resistive (AMR) sensor, a giant magneto-resistive (GMR) sensor, a colossal magneto-resistive (CMR) sensor, a hall effect sensor, a fluxgate sensor, or a coil sensor that is able to detect small shifts in magnetic fields may be used.

Magneto-resistive sensors, for example, may be formed using typical integrated circuit fabrication techniques. Permalloy, a ferromagnetic alloy containing nickel and iron, is typically used as the magneto-resistive material. Often, the permalloy is arranged in thin strips of permalloy film. When a current is run through an individual strip, the magnetization direction of the strip may form an angle with the direction of current flow. As the magnetization direction of the strip changes relative to the current flow, its effective resistance also changes. Strip resistance reaches a maximum when the magnetization direction is parallel to the current flow, and reaches minimum when the magnetization direction is perpendicular to the current flow. Such changes in strip resistance result in a change in voltage drop across the strip when an electric current is run through it. This change in voltage drop can be measured and used as an indication of change in the magnetization direction of external magnetic fields acting on the strip.

To form the magnetic field sensing structure of a magneto-resistive sensor, several permalloy strips may be electrically connected together. The permalloy strips may be placed on the substrate of the magneto-resistive sensor as a continuous resistor in a "herringbone" pattern or as a linear strip of magneto-resistive material, with conductors across the strip at an angle of 45 degrees to the long axis of the strip. This latter configuration is known as "barber-pole biasing." The positioning of conductors in a "barber-pole biasing" configuration may force the current in a strip to flow at a 45-degree angle to the long axis of the strip. These magneto-resistive sensing structure designs are discussed in U.S. Pat. No. 4,847,584, Jul. 11, 1989, to Bharat B. Pant, and assigned to the same assignee as the current application. U.S. Pat. No. 4,847,584 is hereby fully incorporated by reference. Additional patents and patent applications describing magnetic sensor technologies are set forth below, in conjunction with the discussion of FIG. 4.

Magnetic sensors often include a number of straps through which current may be run for controlling and adjusting sensing characteristics. For example, magnetic sensor designs often include set, reset, and offset straps. These straps can improve the performance and accuracy of magnetic sensors, but require driver circuitry for proper operation. Such circuitry has typically been located off-chip from the magnetic sensor, resulting in space inefficiencies. Similarly, other components, such as operational amplifiers, transistors, capacitors, etc., have typically been implemented on a separate chip from the magnetic sensor. Both signal conditioning and electrostatic discharge circuitry, for example, are typically located off-chip. Although such off-chip circuitry is adequate for many applications, for those where physical space is at a premium it would be desirable to have necessary circuitry integrated into a single-chip magnetic sensor, thereby conserving space.

One consequence of the space inefficiencies of multiple-chip magnetic sensors is the stunting of technological advances in the integration of compassing and positioning technologies. To take advantage of the functionality of both magnetic sensors and positioning technologies, at least one additional positioning chip is required. The Global Positioning System (GPS), the leading positioning technology, enables a GPS receiver to determine its position on the earth from a set of concurrently received signals transmitted by at least three of a constellation of GPS satellites. GPS receivers can also determine heading using the same signals used to determine position. However, in order to obtain an accurate heading, the GPS receiver must be moving at a speed of at least 10 mph. As a result, GPS has been successfully used for positioning in both handheld and vehicle-mounted systems, as well as for navigation in vehicle mounted systems (when traveling at a speed of at least 10 mph).

By combining the functionality of a magnetic field sensing device with that of a GPS receiver, a user can determine both direction (from the magnetic field sensing device) and position (from the GPS receiver), both when stationary and when moving. However, for handheld applications, such a combination may be unwieldy and inefficient due to the physical space requirements of a GPS receiver chip, a magnetic field sensing device chip, and a potential for additional chips required for magnetic field sensing device circuitry. Thus, a single-chip design that would minimize the physical space required to integrate a GPS receiver with a magnetic field sensing device would be desirable.

SUMMARY

One exemplary embodiment provides a single package sensor device. The single package sensor device is comprised of GPS receiver circuitry and a magnetic field sensing device adjacent to the GPS receiver circuitry. The single-package integration of the GPS receiver circuitry and the magnetic field sensing device can be accomplished in the following two ways: (1) a single-die, single package solution and (2) a multiple-die, single-package solution. Because such an integrated device may be manufactured as a single package, the user may realize advantages that include possible cost reduction, reduced size, and increased functionality, among others.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present invention are described with reference to the following drawings, wherein.

DETAILED DESCRIPTION

In view of the wide variety of embodiments to which the principles of the present invention can be applied, it should be understood that the illustrated embodiments are exemplary only, and should not be taken as limiting the scope of the present invention.

Figure 1A:
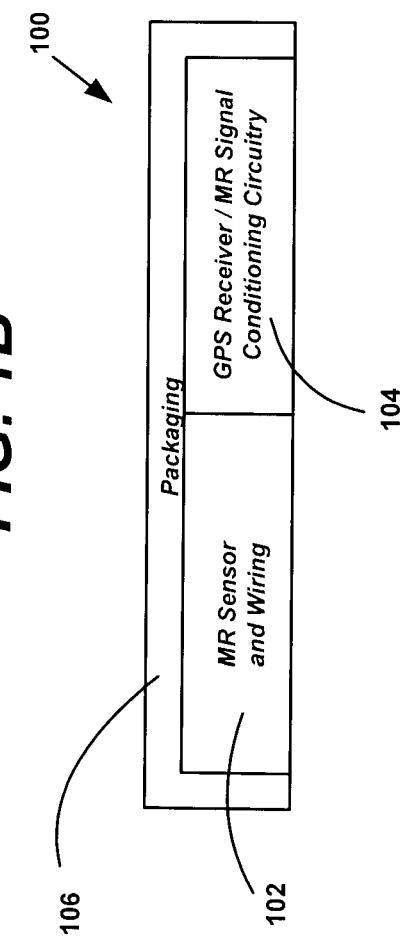
FIGS. 1A-1C are simplified block diagrams illustrating embodiments of the present invention.
Figure 1B:
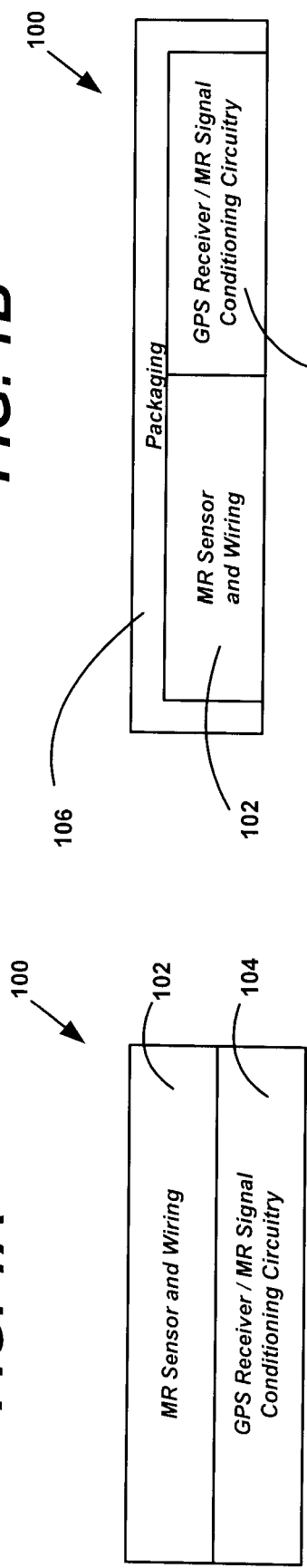
Figure 1C:
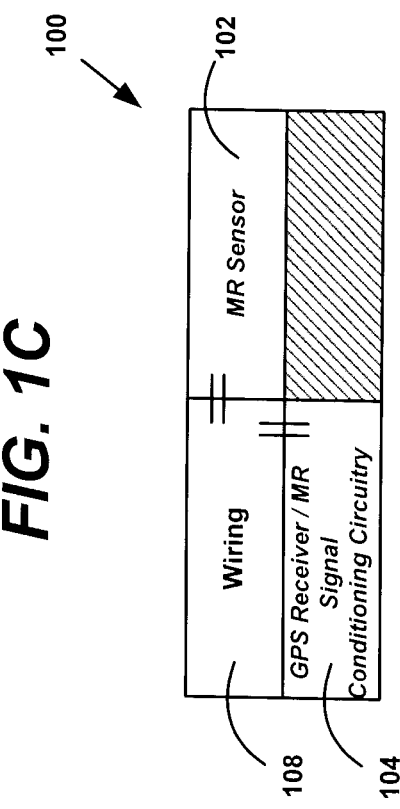

FIGS. 1A-1C are block diagrams illustrating an integration of a GPS receiver with a magnetic field sensing device (i.e. a magneto-resistive sensor). The device 100 of FIGS. 1A and 1B includes a first portion 102, including a magneto-resistive sensor and wiring, and a second portion 104, including GPS receiver circuitry. In a preferred embodiment, the second portion 104 also includes signal conditioning circuitry and circuitry for ESD (electro-static discharge) protection for the magneto-resistive sensor in the first portion 102. As discussed below, the second portion 104 is particularly amenable to standard semiconductor fabrication techniques, such as those used for CMOS (complementary metal oxide semiconductor). The first and second portions 102, 104 are included within a single chip, so that the device 100 is a discrete, one-chip design.

Prior attempts to integrate a GPS receiver and electronic compassing using a magneto-resistive sensor have typically involved at least two chips placed separately on a printed circuit board, which likely results in a larger-sized end-user device (e.g. cell phone, portable device, watch, etc.) and increased complexity. The one-chip design of device 100, however, provides reduced sized and added functionality. This smaller size may be useful in such applications as cell phones, handheld GPS units, and watches, for example. Further, this integrated design allows a user to determine a compass heading both while stationary and while moving. GPS (and other satellite-based systems) require the GPS receiver to be moving at an approximate velocity of at least 10 m.p.h. relative to the surface of the earth in order to allow the GPS receiver to determine a compass heading, based on past and present position. Thus, if used in a cell phone, for example, the one-chip design of device 100 could allow a user to determine both position and heading while standing or walking. Other applications may include industrial or automotive uses.

The first and second portions 102, 104 of the device 100 may be manufactured using standard RF/microwave processes, such as CMOS, gallium-arsenide (GaAs), germanium, BiCMOS (bipolarCMOS), InP (indium phosphide), SOI (silicon-on-insulator), and MOI (microwave-on-insulator). While a technology like GaAs may provide advantages in operational speed, reduced power consumption might best be realized through the use of other techniques, such as those involving SOI (Silicon on Insulator) or MOI (Microwave-On-Insulator), a variation of SOI. In a preferred embodiment, the first portion 102 is manufactured using standard lithography, metallization, and etch processes. The second portion 104 is preferably manufactured using Honeywell's MOI-5 0.35 micron processing, or another RF/microwave method, such as GaAs processing.

Integrating the magnetic field sensing device with the GPS receiver in a single chip design may be accomplished in at least two ways. FIGS. 1A illustrates a first embodiment where a magneto-resistive sensor 102 is fabricated on a single die along with the GPS receiver 104 and possibly other circuitry, such as signal conditioning and ESD protection circuitry, for example. In the embodiment illustrated in FIG. 1A, the GPS receiver 104 and other circuitry and the magneto-resistive sensor 102 are located in discrete layers in a single die.

FIG. 1B illustrates a second way in which a magnetic field sensing device can be integrated with a GPS receiver. In FIG. 1B, a magneto-resistive sensor 102 is fabricated on a first die, while the GPS receiver 104 and signal conditioning circuitry are fabricated on a second die. The first die and the second die may then be placed in close proximity to one another and packaged within a single integrated circuit chip 106. In all cases, it may be advantageous to include one or more electrical connections between the GPS receiver 104 and the magneto-resistive sensor 102 to provide feedback, for example. Alternatively, the GPS receiver 104 and magneto-resistive sensor 102 may simply be located physically close to one another with no intentional electrical interaction.

Additionally, FIG. 1C. illustrates a second embodiment of a single die integration wherein a magneto-resistive sensor 102 and a GPS receiver 104 and other circuitry are contained in a single die. However, in the embodiment illustrated in FIG. 1C, wiring 108 and the magneto-resistive sensor 102 are contained in separate portions of the second portion of the die.

Some GPS receiver circuitry and signal conditioning circuitry may generate electromagnetic fields significant enough to influence the operation of the magnetic field sensing device. As a result, the sensitive parts of the first portion 102 of the integrated device 100 may need to be physically separated from parts of the second portion 104 in order to provide optimal magnetic field sensing device operation. The amount of separation may be determined using theoretical or empirical means, for example.

Figure 2A:
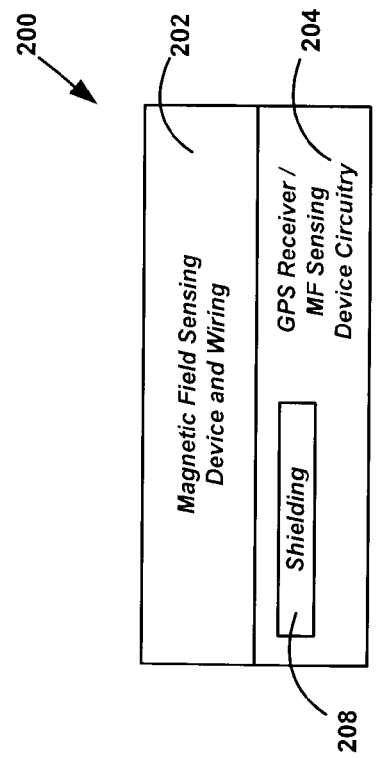
FIGS. 2A-2C are simplified block diagrams illustrating embodiments of the present invention with included shielding features.
Figure 2B:
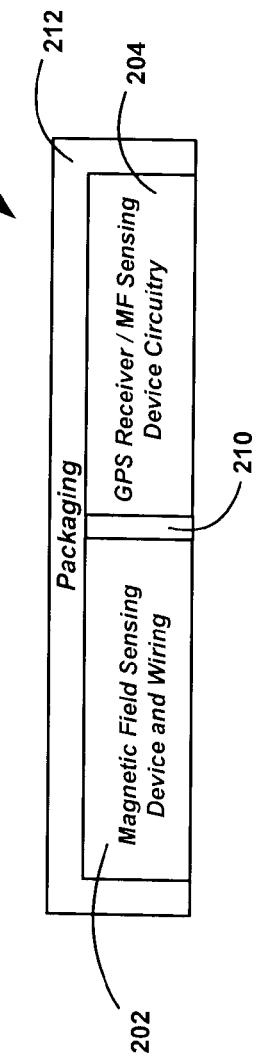
Figure 2C:
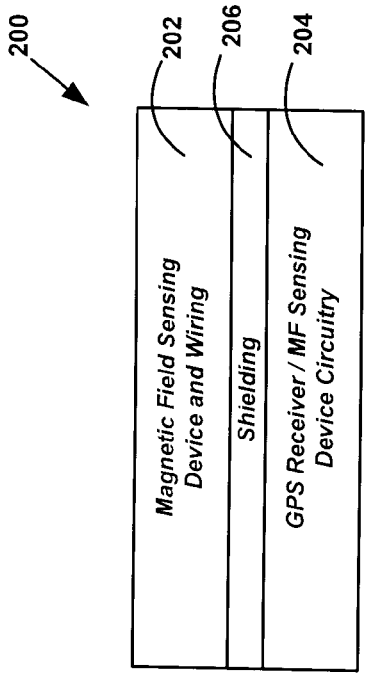

As an alternative to introducing physical separation between potentially interfering parts of the integrated device 100, a shielding layer may be provided. FIGS. 2A-2C illustrate three exemplary configurations for such a shield. The device 200 of FIG. 2A is a single die integration of a magnetic field sensing device 202 and a GPS receiver 204 with a shielding layer 206 located substantially between the two. The shielding layer 206 may extend over some of or over the entire interface between the first and second portions 202, 204, depending on the characteristics of the electromagnetic fields and the location of sensitive components.

FIG. 2B illustrates a single die integrated magnetic field sensing device 202 and GPS receiver 204 with a shielding layer 208 located within the second portion 204. Shielding layer 208 is a localized shield which might be beneficial where the majority of the magnetic field effects originate from a relatively small part of the second portion 204. The shield 208 may also be advantageous in designs having electrical connections between the first and second portions 202, 204. However, shielding layer 208 could be made less localized where necessary to properly shield sensitive components.

FIG. 2C illustrates a multiple die, integrated magnetic field sensing device 202 and GPS receiver 204 with a shielding layer 210 located substantially between the magnetic field sensing device 202 and the GPS receiver 204. The shielding layer 210 may extend over some of or over the entire interface between the magnetic field sensing device 202 and the GPS receiver 204, depending on the characteristics of the electromagnetic fields and the location of sensitive components. The magnetic field sensing device 202, the GPS receiver 204, and the shielding layer 210 are contained in a single-chip package 212. For all embodiments, use of a shielding layer will likely allow tighter integration of the device 200 than use of physical separation of physical parts. While such a shielding layer may comprise metal or a magnetic material (e.g. NiFe film), other materials may also be suitable.

Figure 3:
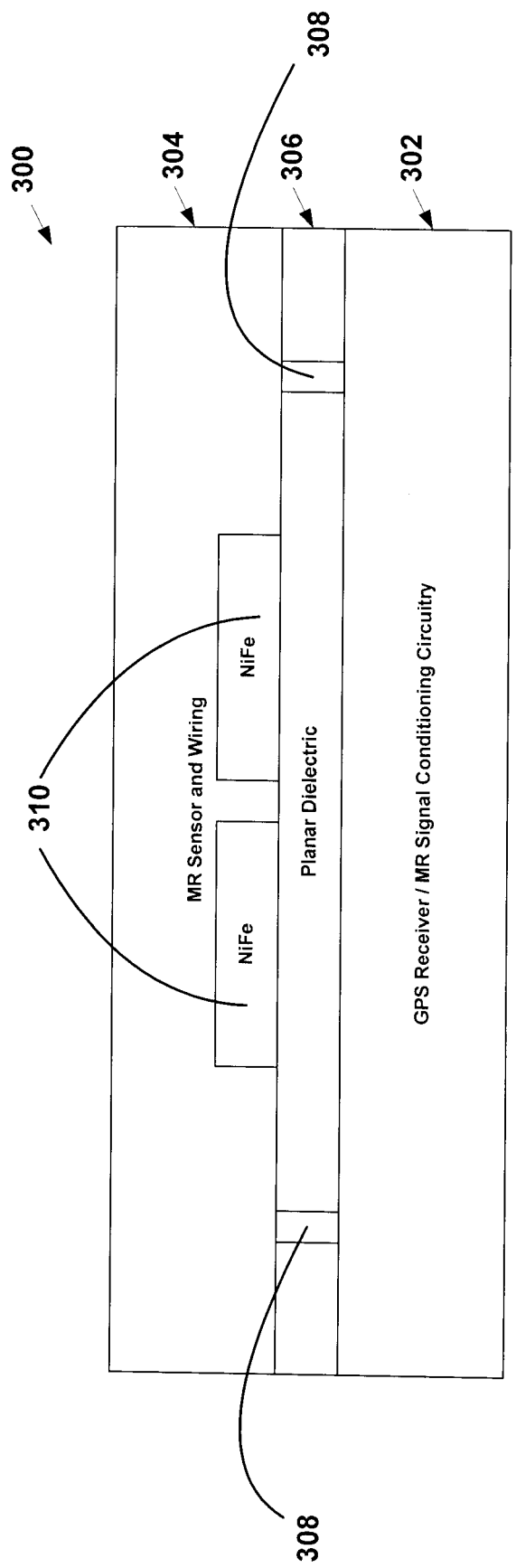
FIG. 3 is a simplified block diagram illustrating a GPS receiver and a magneto-resistive sensor integrated on a single die in accordance with an embodiment of the present invention.

FIG. 3 illustrates an exemplary architecture of a device 300, in which a GPS receiver 302 may be implemented with a magnetic field sensing device 304 on a single die. The GPS receiver circuitry (along with any signal conditioning circuitry and drivers for set and/or offset straps associated with the magnetic field sensing device portion) may be fabricated largely within the GPS receiver under layer 302, while a magneto-resistive sensor 304 may be fabricated above the planar dielectric layer 306. Also shown in FIG. 3 are contacts 308 for connecting the GPS receiver under layer 302 with the magneto-resistive sensor 304. Additionally, NiFe permalloy structures 310 which are part of the magneto-resistive sensor 304 are shown.

In a preferred embodiment, the GPS receiver under layer 302 may be fabricated first. A substantially planar dielectric layer 306 (i.e. contact glass) is then deposited on the GPS receiver under layer 302, on top of which the magneto-resistive sensor 304 is then fabricated. The GPS receiver under layer 302 is fabricated first because its fabrication processes usually require the highest temperatures. Additionally, the function of the planar dielectric layer 306 is to provide a substantially planar surface on which the magneto-resistive sensor can be fabricated, as well as to electrically isolate the GPS receiver under layer 302 from the magneto-resistive sensor 304.

Figure 4:
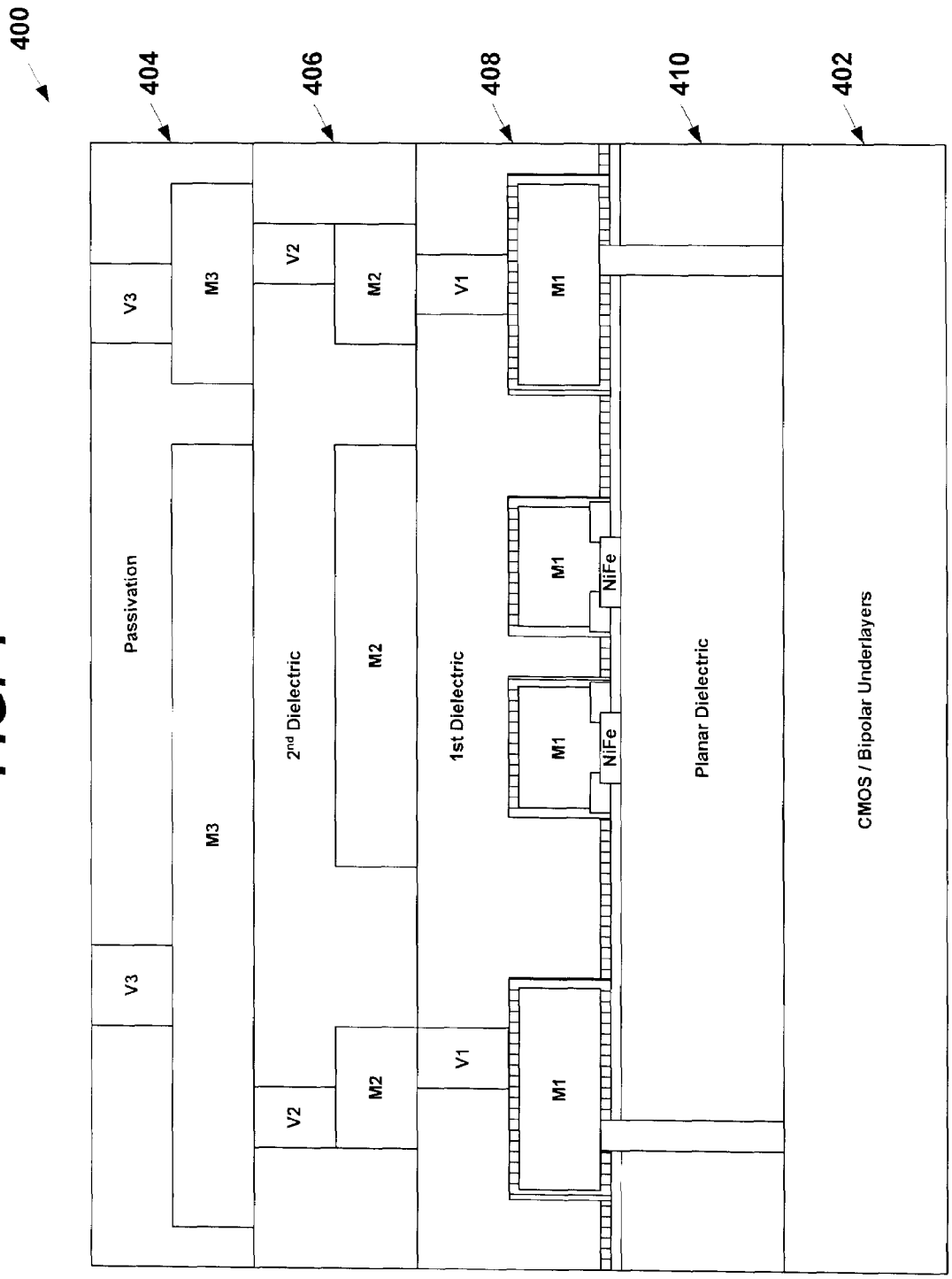
FIG. 4 is a simplified block diagram illustrating a device-architecture for a GPS receiver and a magneto-resistive sensor integrated in a single die in accordance with an embodiment of the present invention.

FIG. 4 illustrates a detailed view of an exemplary architecture of a device 400, in which a GPS receiver may be implemented with a magnetic field sensing device on a single die. The GPS receiver circuitry (along with any signal conditioning circuitry and drivers for set and/or offset straps associated with the magnetic field sensing device portion) may be fabricated largely within the CMOS/Bipolar under layers 402, while a magneto-resistive sensor may be fabricated in layers 404-408, above the planar dielectric layer 410. Also shown in FIG. 4 are various contacts V1-V3 and metallizations M1-M3, NiFe permalloy structures, a $1^{st}$ dielectric layer 408, a second dielectric layer 406, and a passivation layer 404. In one embodiment, layers 404-408 are formed using standard lithography, metallization, and etch processes, while layers 410 and 402 are formed using Honeywell's MOI-5 0.35 micron processing, or another RF/microwave method, such as GaAs processing. Other components of the magneto-resistive sensor (such as set, reset, and offset straps; signal conditioning circuitry, and ESD protection circuitry) may be included in various locations in the layers 408-410 and 402, and are not fully illustrated in FIG. 4.

For further information on magneto-resistive sensor designs, reference may be made to the following patents and/or patent applications, all of which are incorporated by reference herein:

U.S. Pat. No. 6,529,114, Bohlinger et al., "Magnetic Field Sensing Device"

U.S. Pat. No. 6,232,776, Pant et al., "Magnetic Field Sensor for Isotropically Sensing an Incident Magnetic Field in a Sensor Plane"

U.S. Pat. No. 5,952,825, Wan, "Magnetic Field Sensing Device Having Integral Coils for Producing Magnetic Fields"

U.S. Pat. No. 5,820,924, Witcraft et al., "Method of Fabricating a Magnetoresistive Sensor"

U.S. Pat. No. 5,247,278, Pant et al., "Magnetic Field Sensing Device"

U.S. patent application Ser. No. 09/947,733, Witcraft et al., "Method and System for Improving the Efficiency of the Set and Offset Straps on a Magnetic Sensor"

U.S. patent application Ser. No. 10/002,454, Wan et al., "360-Degree Rotary Position Sensor"

In addition, U.S. Pat. No. 5,521,501, to Dettmann et al., titled "Magnetic Field Sensor Constructed From a Remagnetization Line and One Magnetoresistive Resistor or a Plurality of Magnetoresistive Resistors" is also incorporated herein by reference, and may provide additional details on constructing a magneto-resistive sensor.

Figure 5:
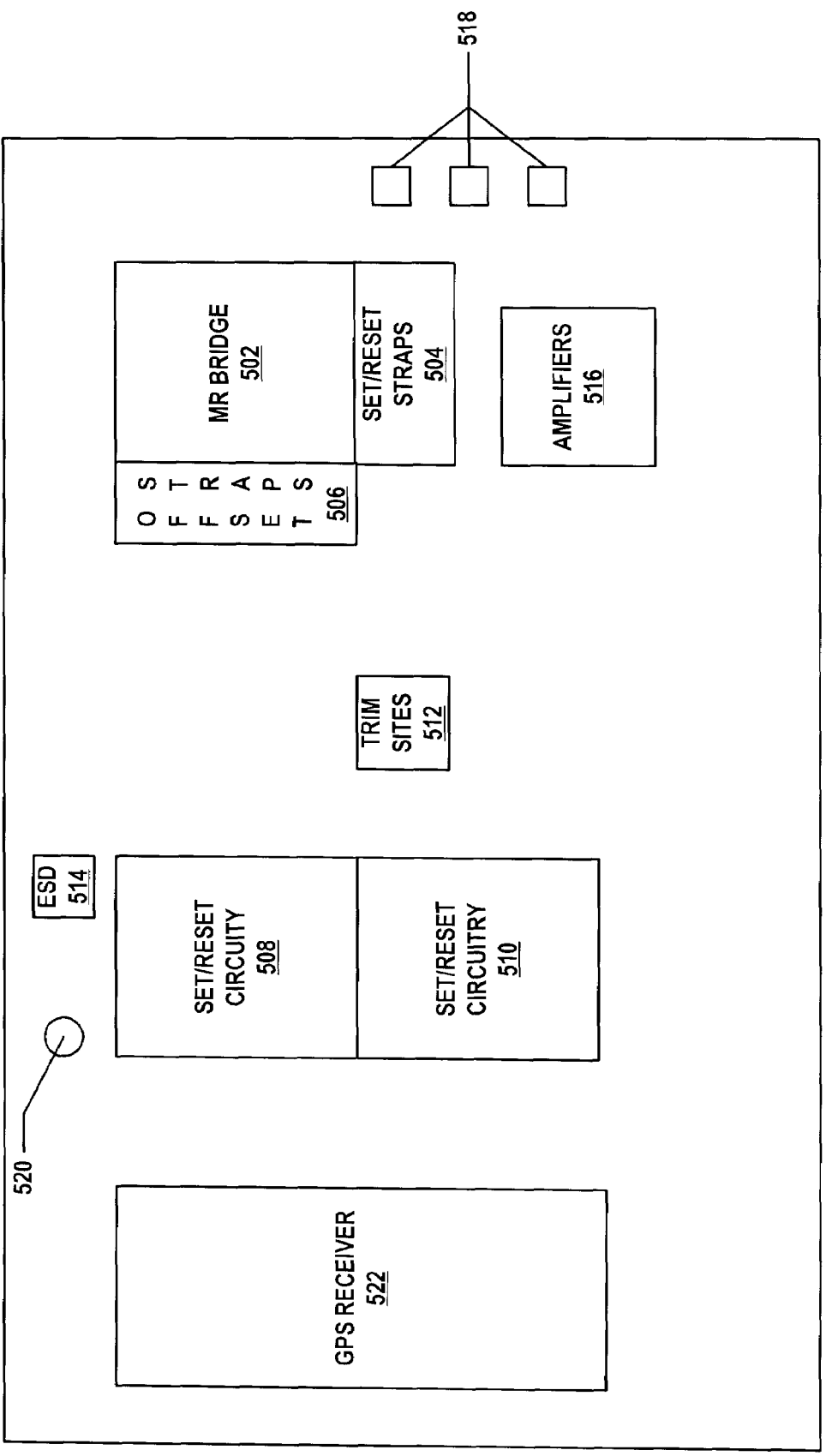
FIG. 5 is a simplified block diagram illustrating a magneto-resistive sensor with GPS receiver components in accordance with an exemplary embodiment of the present invention.

FIG. 5 illustrates a plan view of one embodiment of a device 500 in which a GPS receiver is integrated with a magnetic field sensing device on a single die. The structures visible in FIG. 5 are attributable largely to a magnetoresistive sensor (and other circuitry, such as set/offset drivers or magnetic sensor signal conditioning circuitry formed in the under layers of the device 500). Exemplary parts of the device 500 include a magneto-resistive bridge 502, set/reset straps 504, offset straps 506, set/reset circuitry 508, 510, laser trim sites 512 (for matching impedance of the legs of the magneto-resistive bridge 502), ESD protection diode 514, operational amplifiers 516, contacts 518, test sites 520, and GPS receiver components 522. Reference may be made to the patents and patent applications incorporated above for further information.

Figure 6:
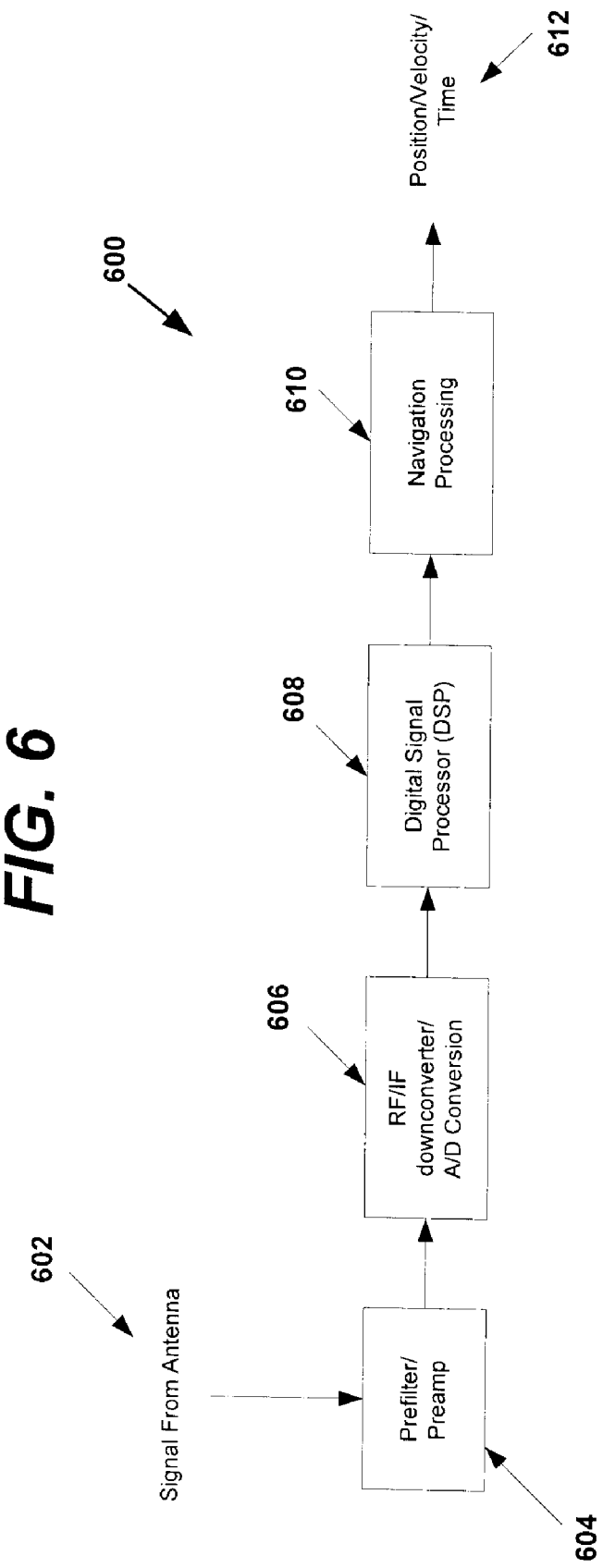
FIG. 6 is a simplified block diagram illustrating a typical GPS receiver.

FIG. 6 is a simplified block diagram of a GPS receiver 600. The GPS receiver 600 receives signals 602 from at least three different GPS satellites received by an antenna on the device. The received signals 602 are then usually filtered by a passive bandpass prefilter 604 to reduce out-of-band RF interference and preamplified 604. Next, the RF signals are typically down converted to an intermediate frequency (IF) 606, and converted from analog to digital 606. These signals are then sent to the digital signal processor (DSP) 608. From the DSP 608 the signal undergoes navigation processing 610, which yields position, velocity, and time information 612. Because conventional processes are used, the particular GPS circuitry is not disclosed herein, as it is flexible. Thus, conventional GPS receiver designs implementable in CMOS/GaAs/BiCMOS, for example, can be utilized in accordance with the presently disclosed embodiments.

Figure 7:
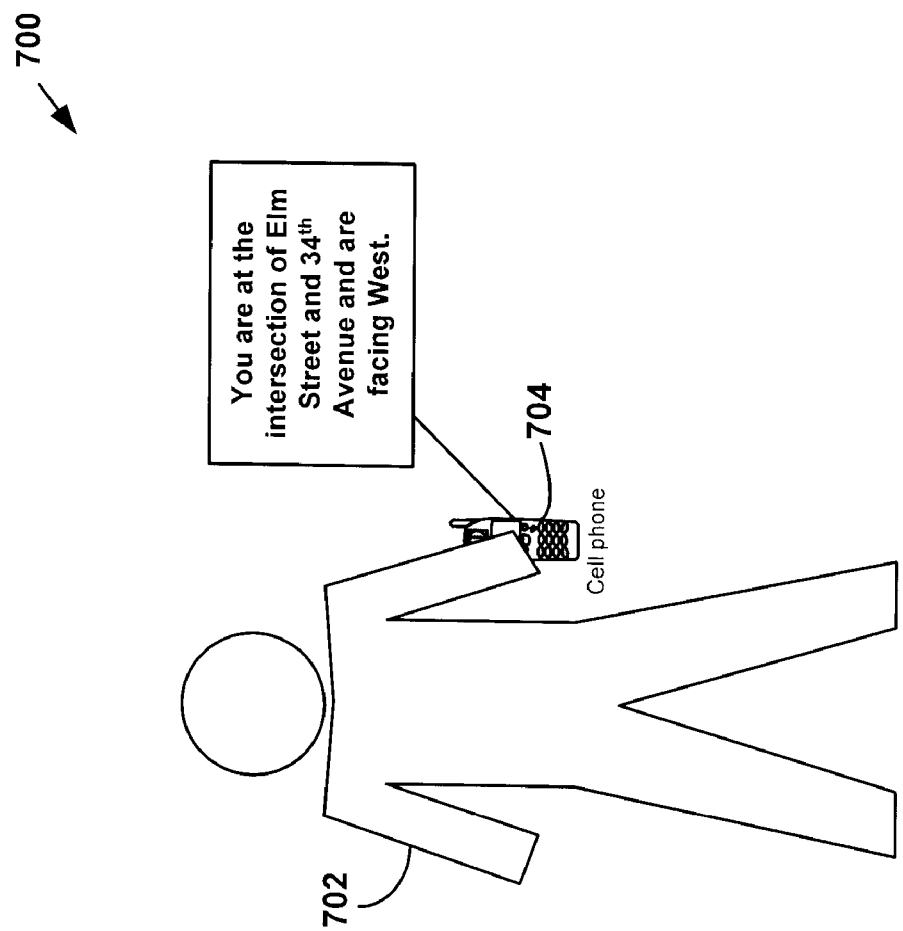
FIG. 7 is a simplified block diagram illustrating an exemplary use for an integrated GPS receiver and magneto-resistive sensor in accordance with an embodiment of the present invention.

FIG. 7 illustrates one application 700 for the integrated GPS receiver and magnetic field sensing device set forth herein. A user 702 is shown with a cell phone 704 having a single-chip integrated GPS receiver and magnetic field sensing device. The user 702 is able to obtain location and heading information by orienting the cell phone 704 in the direction the user 702 is facing, for example. The magnetic field sensing device is able to determine direction while the GPS receiver is able to determine the user's 702 location. The combination provides synergistic effects, such as the ability to perform database lookups to combine directions with yellow page information. For example, a user 702 could obtain a phone number for a business or residence the user is facing by causing the cell phone 704 to transmit location and heading information to a network server, which could respond with the phone number.

Figure 8:
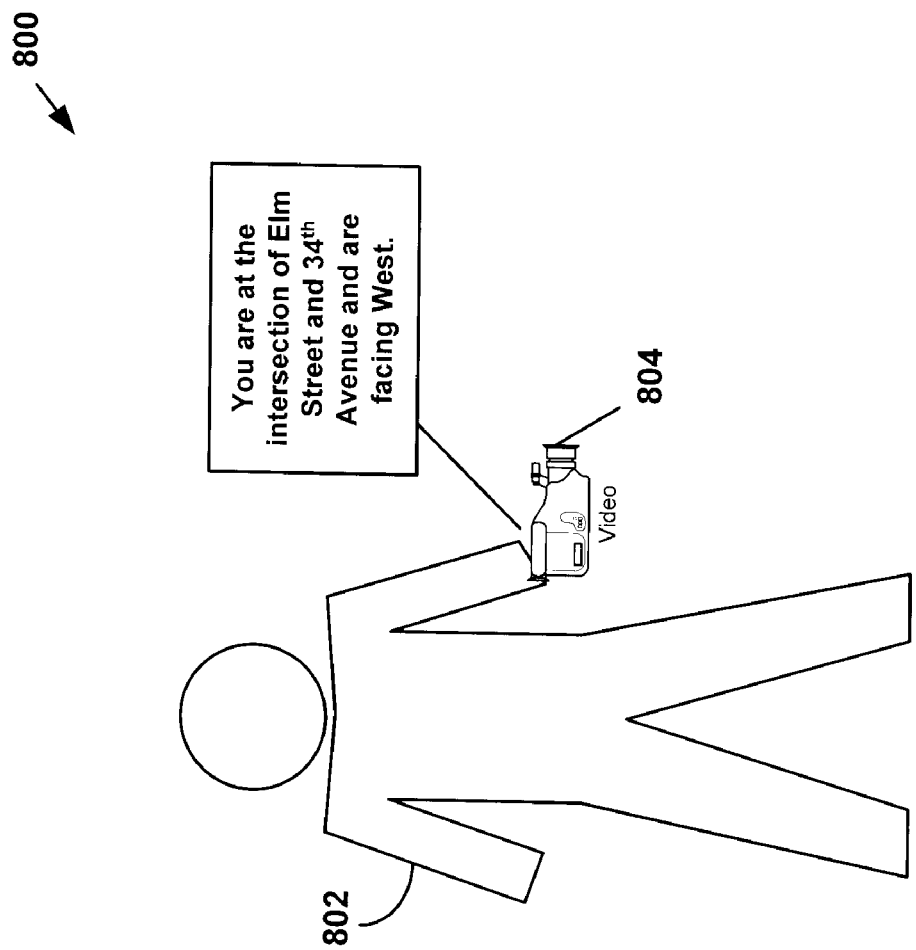
FIG. 8 is a simplified block diagram illustrating an exemplary use for an integrated GPS receiver and magneto-resistive sensor in accordance with an embodiment of the present invention.

FIG. 8 illustrates another application 800 for the integrated GPS receiver and magnetic field sensing device set forth herein. A user 802 is show with a video camera 804 having a single-chip integrated GPS receiver and magnetic field sensing device. The user 802 is able to obtain location and heading information by orienting the video camera 804 in the direction the user is facing. The magnetic field sensing device is able to tell the user 802 what direction he is facing, while the GPS receiver is able to determine the user's 802 location. The combination provides synergistic effects, such as the ability to record location and heading information which correlates to the footage being recorded by the user 802. This could allow the user 802 to later identify buildings or other landmarks that that were recorded, as well as allow the user 802 to later find the same area where particular footage was recorded. Of course, many other uses are possible as well. Because only one chip is needed, rather than two or more, the overall size of the user's 802 device (e.g. digital camera, cell phone, portable device, watch, etc.) may be kept small.

Table 1, below, shows a simplified exemplary process for integrating a GPS receiver with a magnetic field sensing device. It is believed that such a process is unique because, in the past, semiconductor foundries have gone to great lengths to prevent contamination of their processes with materials typically used in manufacturing magnetic sensors. In addition, companies in the magnetic industries (e.g. disk drive head manufacturers, etc.) have been separate from electronics companies, and their specialized manufacturing techniques have been kept largely separate from one another.

TABLE 1

| Sample Manufacturing Process |
| --- |
| CMOS, Bipolar, GaAs, BiCMOS, InP, SOI, MOI underlayers (end front-end processing; begin back-end processing) |
| Deposit contact glass (if any), reflow |
| Form magnetic field sensing device layer |
| Inspection and evaluation |

In a preferred embodiment, the semiconductor device processing (i.e. CMOS, Bipolar, GaAs, etc.) is done at the front end, while the metal interconnect and the magnetic field sensing device are done at the back end. Table 1 is intended to be generally applicable to any magnetic field sensing device manufacturing process, and thus does not include detail on how to obtain particular architectures. Additional cleaning and other steps should be implemented as appropriate.

An exemplary embodiment of the present invention has been described above. Those skilled in the art will understand, however, that changes and modifications may be made to this embodiment without departing from the true scope and spirit of the present invention, which is defined by the claims.

What is claimed is:

1. A single package sensor device comprising:
   GPS receiver circuitry; and
   at least one magnetic field sensing device adjacent to the GPS receiver circuitry;
   wherein the GPS receiver circuitry and the at least one magnetic field sensing device are formed in at least two separate die, all die being contained in a single package;
   wherein the at least one magnetic field sensing device is used for electronic compassing.

2. The sensor device of claim 1 wherein the at least one magnetic field sensing device comprises a sensor selected from one of the group consisting of a compassing sensor, an anisotropic magneto-resistive (AMR) sensor, a giant magneto-resistive (GMR) sensor, a Giant Magneto-Impendence sensor (GMI), a colossal magneto-resistive (CMR) sensor, a hall effect sensor, a fluxgate sensor, and a coil sensor.

3. The sensor device of claim 1 wherein the GPS receiver circuitry is formed from any of complementary-metal-oxide-semiconductor (CMOS), gallium-arsenide (GaAs), germanium, bipolarCMOS (BiCMOS), indium phosphide (InP), silicon-on-insulator (SOI), and microwave-on-insulator (MOI) technologies.

4. The sensor device of claim 1 wherein at least one shield comprising a material selected from the group consisting of metal, magnetic material, and other isolating material is disposed between the GPS receiver circuitry and the at least one magnetic field sensing device.

5. The sensor device of claim 1 further comprising at least one connection pathway for connecting the GPS receiver circuitry with the at least one magnetic field sensing device.

6. The sensor device of claim 5 further comprising conducting portions disposed in the at least one connection pathway.

7. The sensor device of claim 1 wherein the at least one magnetic field sensing device includes at least one of a set strap, a reset strap, and an offset strap.

8. The sensor device of claim 7 wherein the GPS receiver circuitry includes driver circuitry for any of the included set, reset, and offset straps.

9. The sensor device of claim 1 wherein the GPS receiver circuitry is formed using MOI-5 0.35 micron technology.

10. The sensor device of claim 9 wherein the at least one magnetic field sensing device is formed using standard fabricating processes for forming magneto-resistive sensors.

11. The sensor device of claim 1, wherein the at least one shield prevents the GPS receiver circuitry from undesirably affecting the operation of the at least one magnetic field sensing device.

12. The sensor device of claim 1, wherein the at least one shield prevents the at least one magnetic field sensing device from undesirably affecting the operation of the GPS receiver circuitry.

13. The sensor device of claim 1 wherein the at least two separate die have no intentional electrical interaction.

14. A single package sensor device comprising:
GPS receiver circuitry formed from any of complementary-metal-oxide-semiconductor (CMOS), gallium-arsenide (GaAs), germanium, bipolarCMOS (BiCMOS), indium phosphide (InP), silicon-on-insulator (SOI), and microwave-on-insulator (MOI) technologies; and
at least one magnetic field sensing device adjacent to the GPS receiver circuitry, the at least one magnetic field sensing device comprising a sensor selected from the group consisting of a compassing sensor, an anisotropic magneto-resistive (AMR) sensor, a giant magneto-resistive (GMR) sensor, GMI, a colossal magneto-resistive (CMR) sensor, a hall effect sensor, a fluxgate sensor, and a coil sensor;
wherein the GPS receiver circuitry and the at least one magnetic field sensing device are formed in at least two separate die, all die being contained in a single-chip package;
wherein at least one shield comprising a material selected from the group consisting of metal, magnetic material, and other isolating material is disposed between the GPS receiver circuitry and the at least one magnetic field sensing device; and
wherein the at least one magnetic field sensing device is used for electronic compassing.

15. A single package sensor device comprising:
GPS receiver circuitry formed from any of complementary-metal-oxide-semiconductor (CMOS), gallium-arsenide (GaAs), germanium, bipolarCMOS (BiCMOS), indium phosphide (InP), silicon-on-insulator (SOI), and microwave-on-insulator (MOI) technologies;
at least one magnetic field sensing device adjacent to the GPS receiver circuitry, the at least one magnetic field sensing device comprising a sensor selected from the group consisting of a compassing sensor, an anisotropic magneto-resistive (AMR) sensor, a giant magneto-resistive (GMR) sensor, GMI, a colossal magneto-resistive (CMR) sensor, a hall effect sensor, a fluxgate sensor, and a coil sensor; and
wherein the GPS receiver circuitry and the at least one magnetic field sensing device are formed in at least two separate die, all die being contained in a single-chip package;
wherein at least one shield comprising a material selected from the group consisting of metal, magnetic material, and other isolating material is disposed between the GPS receiver circuitry and the at least one magnetic field sensing device; and
wherein the at least one magnetic field sensing device is used for electronic compassing.

* * * * *